(12) United States Patent
Reilly

(10) Patent No.: US 10,915,434 B2
(45) Date of Patent: Feb. 9, 2021

(54) METHOD FOR CONTROLLING A TEST ENVIRONMENT ON A MOBILE DEVICE

(71) Applicant: GRAD DNA LTD., Kent (GB)

(72) Inventor: Stephen Reilly, Kent (GB)

(73) Assignee: GRAD DNA LTD., Kent (GB)

(*) Notice: Subject to any disclaimer, the term of this patent is extended or adjusted under 35 U.S.C. 154(b) by 0 days.

(21) Appl. No.: 15/892,806

(22) Filed: Feb. 9, 2018

(65) Prior Publication Data

US 2018/0232301 A1    Aug. 16, 2018

Related U.S. Application Data

(60) Provisional application No. 62/457,303, filed on Feb. 10, 2017.

(51) Int. Cl.
  *G06F 11/00* (2006.01)
  *G06F 11/36* (2006.01)

(52) U.S. Cl.
  CPC ...... *G06F 11/3688* (2013.01); *G06F 11/3664* (2013.01); *G06F 11/3692* (2013.01)

(58) Field of Classification Search
  CPC ............ G06F 11/3688; G06F 11/3692; G06F 11/3664
  See application file for complete search history.

(56) References Cited

U.S. PATENT DOCUMENTS

| 2014/0012686 A1* | 1/2014 | Arbon | G06Q 30/0277 705/14.73 |
| 2014/0194774 A1* | 7/2014 | Gilligan | G16H 40/67 600/559 |
| 2014/0222995 A1 | 8/2014 | Radzen et al. | |
| 2017/0139845 A1* | 5/2017 | Bhati | H04L 63/108 |

FOREIGN PATENT DOCUMENTS

WO    WO-2015184359 A2 * 12/2015    ........... H04L 67/303

OTHER PUBLICATIONS

UK Examination Report from the UK Intellectual Property Office for Appln No. GB1602369.9 dated Aug. 4, 2020.

* cited by examiner

*Primary Examiner* — Katherine Lin
(74) *Attorney, Agent, or Firm* — Nixon & Vanderhye, P.C.

(57) ABSTRACT

The present invention relates to a method for controlling a test environment on a mobile device. The method includes the steps of providing a test to a user within a testing phase on the device; detecting an interruption via the device during the testing phase; and generating an action in response to the detected interruption. A system for controlling a test environment is also disclosed.

17 Claims, 4 Drawing Sheets

METHOD FOR CONTROLLING A TEST ENVIRONMENT ON A MOBILE DEVICE

This application claims the benefit of U.S. Provisional Application No. 62/457,303 filed Feb. 10, 2017, the entire content of which is hereby incorporated by reference.

FIELD OF INVENTION

The present invention is in the field of device control. More particularly, but not exclusively, the present invention relates to controlling a test environment on a mobile device.

BACKGROUND

Scenarios arise where the environment of a device must be controlled to ensure that a user can provide input without interference. One of these scenarios is when a user is providing input for testing or assessment purposes, such that the user is being themselves assessed by a program executing on device.

A particularly important field where environmental control is necessary is in psychometric testing where results can be ineffective or skewed if the test environment is not strictly controlled. Accordingly, when completing psychometric testing it is important that each user completes the testing in a fare and consistent manner. Traditionally, psychometric tests were pen and paper tests strictly controlled by a test administrator in a classroom environment. Later, test providers published their tests via desktop computers. Test instructions were presented to the user before the user began the test, encouraging them to focus on the tests they were completing, and be undisturbed (e.g. don't take phone calls and tell others not to interrupt them).

It can be seen that, when the environments for the tests are controlled by users, less effective and skewed results are more likely. This would become a particular problem if the tests were deployed on to mobile devices, such as smart-phones or tablets, which are multi-functional and, typically, continually connected to other devices or servers via multiple channel outlets.

There is a desire, therefore, to improve the deployment of tests on mobile devices.

It is an object of the present invention to provide a method and system for controlling test environments on mobile devices which overcomes the disadvantages of the prior art, or at least provides a useful alternative.

SUMMARY OF INVENTION

According to a first aspect of the invention there is provided a method for controlling a test environment on a mobile device including:

providing a test to a user within a testing phase on the device;

detecting an interruption via the device during the testing phase; and generating an action in response to the detected interruption.

The test may be a psychometric test.

The interruption may be a user-driven interruption, a communication-driven interruption, or a locally-driven interruption. The user-driven interruption may be the user accessing other applications on the device or operating system functions. The communication-driven interruption may be a phone-call, text message, or server-side originating notification. The locally-driven interruption may be from another application executing on the device or from the operating system of the device.

The action may be one or more actions selected from the set of restarting the test, notifying an invigilator, recording the interruption with the test, displaying a warning message to the user, locking the test, and transmitting a message to a device for the test provider.

When the interruption is a further interruption for the test, the action generated may be different to an earlier action generated for the initial or earlier interruption(s). For example, the earlier action generated may include a warning and the later action generated may include locking the test.

The test may be provided to the user by a software application executing on the device. The software application may detect the interruption and generate the action.

According to a further aspect of the invention there is provided a system for controlling a test environment on a mobile device, including: A processor configured to provide a test to a user within a testing phase on the device, detect an interruption via the device during the testing phase and generate an action in response to the detected interruption; and A memory configured to store the test.

Other aspects of the invention are described within the claims.

BRIEF DESCRIPTION OF THE DRAWINGS

Embodiments of the invention will now be described, by way of example only, with reference to the accompanying drawings in which.

DETAILED DESCRIPTION OF PREFERRED EMBODIMENTS

The present invention provides a method and system for controlling test environments on mobile devices.

Mobiles devices, such as smart-phones, tablets, smart-watches, etc., are susceptible to constant and continual interruptions from the external world (e.g. email, text, Whatsapp™, Twitter™, Facebook™, Linkedin™, etc) and even, perhaps, notifications originating from applications executing on the mobile device itself.

The inventor has discovered that many interruptions can be detected on mobile devices when tests are being undertaken by a user. Once detected, an action, or actions, can be generated to accommodate, mitigate or record the effect of the interruption on the test.

Figure 1:
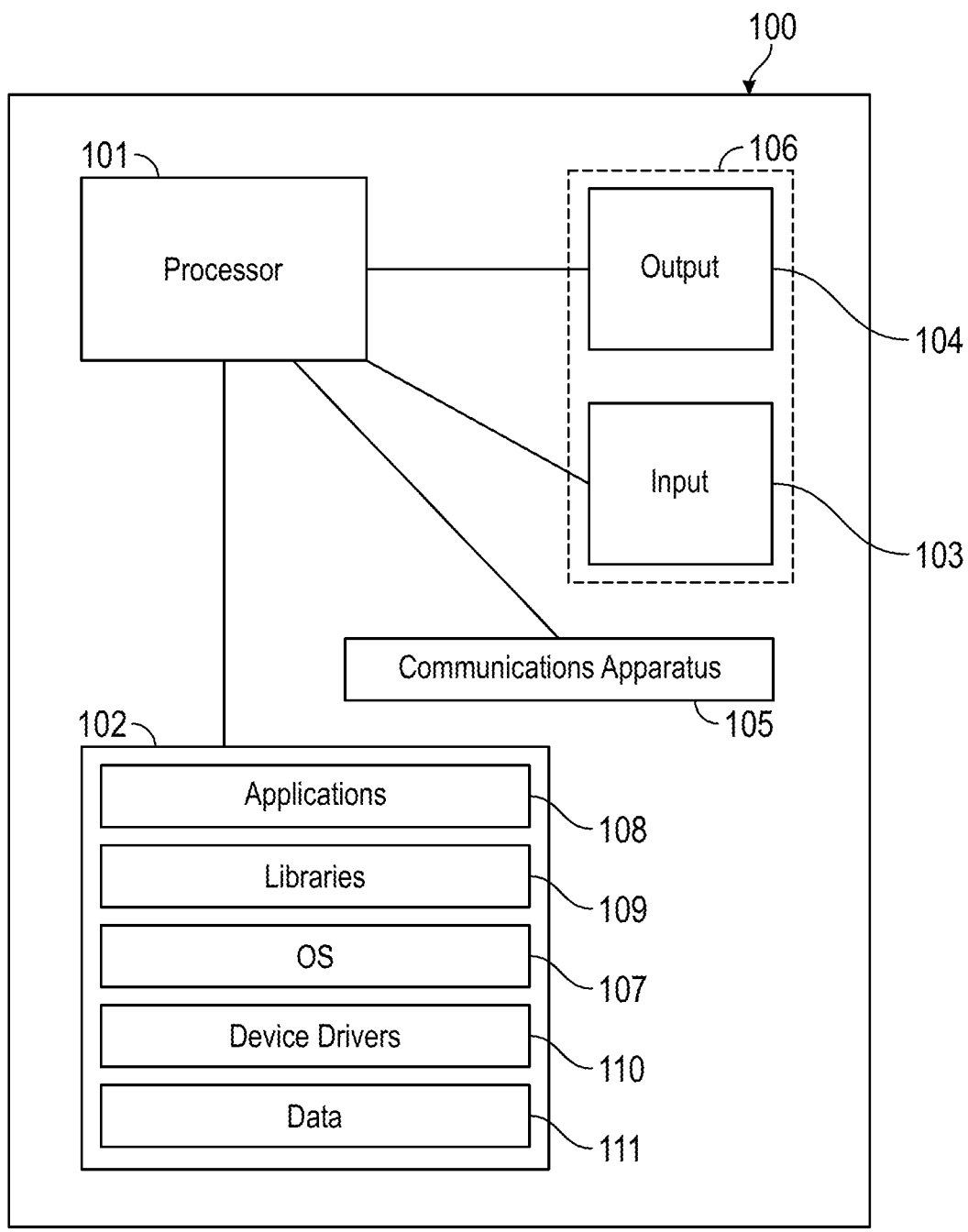
FIG. 1: shows a block diagram illustrating a system in accordance with an embodiment of the invention.

In FIG. 1, a system 100 in accordance with an embodiment of the invention is shown.

The system 100 includes a processor 101, a memory 102, an input apparatus 103, and an output apparatus 104. The system may also include a communications apparatus 105.

The input apparatus 103 may include one or more of a touch/near-touch input, an audio input, a keyboard, a pointer device (such as a mouse), or any other type of input. The touch input may include 3D touch.

The output apparatus 104 may include one or more of a digital screen (such as an LED or OLED screen), an e-ink screen, an audio output, haptic output, or any other type of output.

The input and output apparatuses 103 and 104 may form an integrated user interface 106 such as a touch or near-touch screen.

The system 100, or at least parts of the system, constitute a mobile device 100, such as a smart-phone, a tablet, or a smartwatch. The mobile device 100 may include a common operating system 107 such as Apple iOS, Google Android, or Microsoft Windows Phone.

The system 100 may be configured to provide multi-functionality such as execution of one or more software applications 108, transmitting and receiving communications (e.g. voice communications, text messages, notifications, or any other network communications), and/or monitoring communications or applications and generating notifications. The multi-functionality may be coordinated by the operating system 107 executing on the device 100.

The processor 101 may be configured to provide a test to the user within a testing phase. The test may be a series of questions generated as one or more outputs via the output apparatus 104 (e.g. the test may be displayed as a series of screens via a display screen or generated as audio questions via an audio output). Provision of the test may include receiving one or more answers from the user to each of the questions via the input apparatus 103 (e.g. receiving selection of displayed options via a touch-screen, receiving specific input via a keyboard, or receiving specific input via an audio input).

In one embodiment, the processor 101 provides the test by execution of a testing application.

The processor 101 may be further configured to detect interruptions during the testing phase.

The processor 101 may be further configured to generate one or more actions in response to the detected interruption.

The test application executing on processor 101 detect interruptions and generate actions.

The memory 102 may be configured to store the software applications 108, libraries 109, the operating system 107, device drivers 110, and data 111. The data 111 may include the test and answers provided by a user to the test. The software applications 108 may include the testing application and one or more third party applications.

The processor 101 is configured to execute the software applications 108, libraries 109, operating system 107, and device drivers 110, and to retrieve data 111.

The communications apparatus 105 may be configured to communicate with one or more other devices or servers via a communications interface such as wifi, Bluetooth, and/or cellular (e.g. 2G, 3G, or 4G) and/or across a network (such as a cellular network, a private LAN/WLAN and/or the Internet). The servers may include third party servers such as a notification server and/or an administration server.

Figure 2:
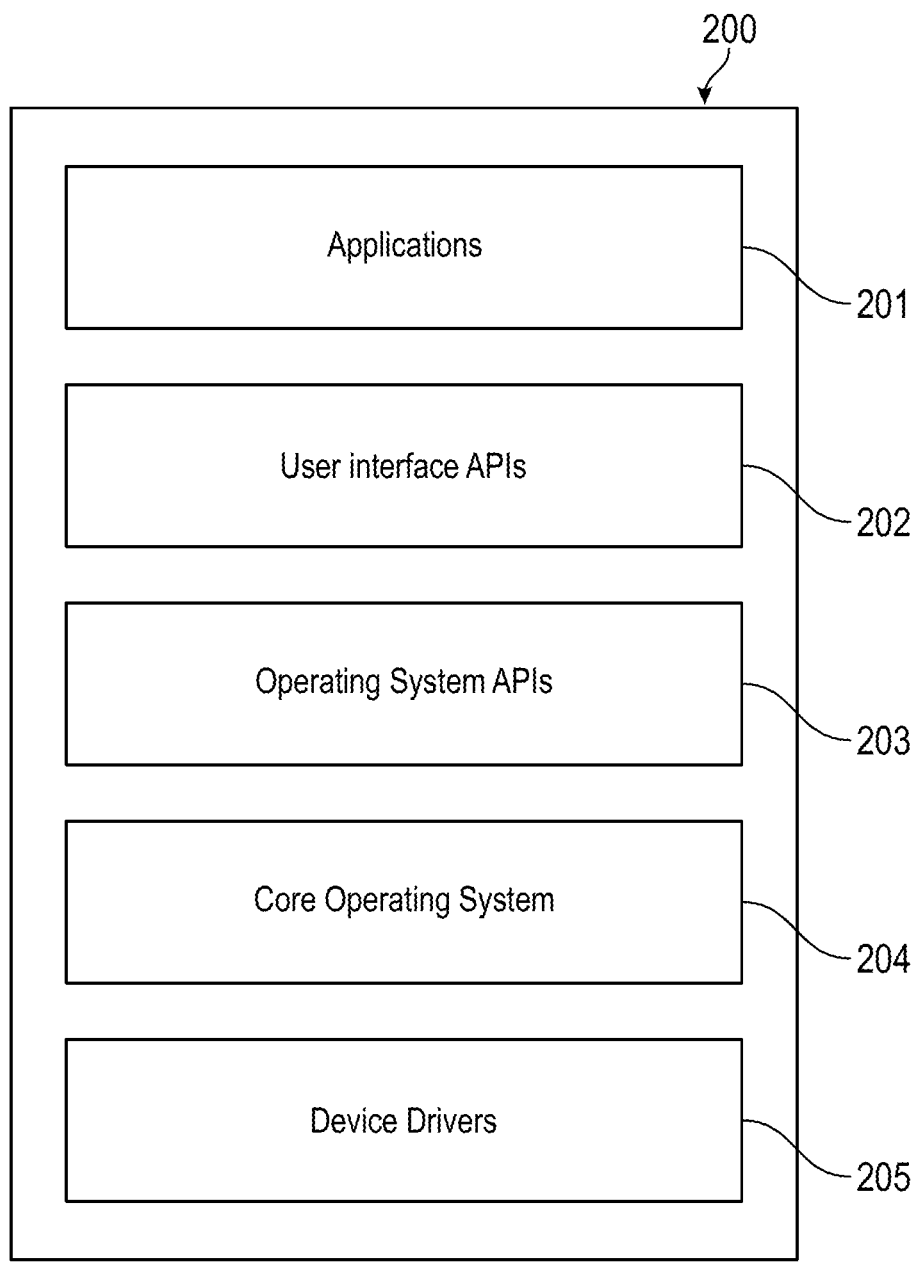
FIG. 2: shows a block diagram illustrating a device software architecture in accordance with an embodiment of the invention.

Referring to FIG. 2, the various layers of the architecture 200 of the device 100 will be described.

Software applications 201 are provided at a top layer. Below this layer are user interface APIs 202 which provide access for the application software 201 to user interface libraries. Below this layer are operating system APIs 203 which provide access for the application software 201 and user interface libraries to the core operating system 204. Below the core operating system 204 are the device drivers 205 which provide access to the input 103, output 104, and communication 105 apparatuses.

Figure 3:
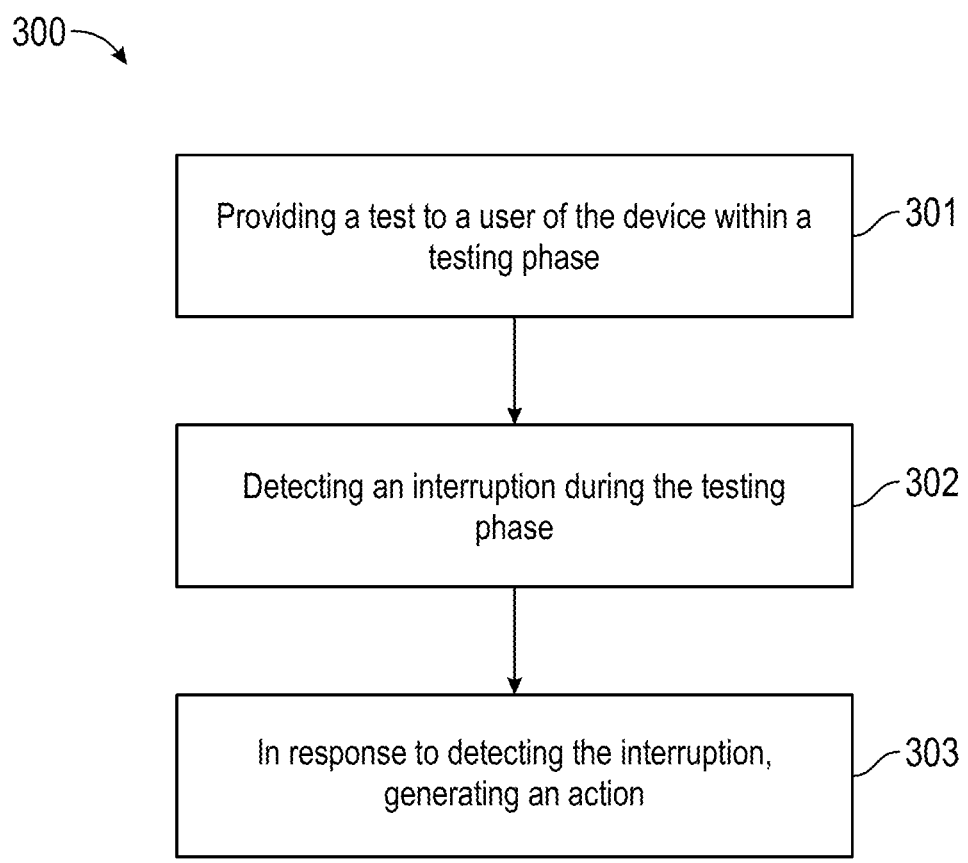
FIG. 3: shows a flow diagram illustrating a method in accordance with an embodiment of the invention.

With reference to FIG. 3, a method 300 in accordance with an embodiment of the invention will be described.

In step 301, a test is provided to a user of the mobile device within the testing phase. The test may be a psychometric test. The test may be loaded from memory, and the answers may be saved in memory. In one embodiment, the test and/or answers may be retrieved/transmitted respectively to a server.

In step 302, an interruption is detected via the device during the testing phase. Different types of interruptions may be detected. The interruption may be a user-driven interruption (such as the user accessing applications on the device or operating system functions on the device), a communication-driven interruption (such as an inbound phone-call, text message, or server-side originating notification), and/or a locally-driven interruption (such as from an application executing on the device or the operating system of the device).

Examples of interruptions that may be detected include:
User driven
    Making a phone-call
    Sending a text-message
    Pressing the home button
    Opening another application
    Switching to another application
    Switching away from the test application
    Changing or opening operating system settings
        Turning on communications settings
            Wifi
            Bluetooth
            Cellular
        Turning off orientation lock
    Taking a screen-shot
    Turning the screen off or locking the device
    Connecting an external display or remote media
Communication-driven
    Receiving a phone-call
    Receiving a text-message
    Receiving a notification via a server
        Receiving a notification relating to software applications on the device (e.g. a Skype notification, an Uber notification, etc.)
Locally-driven
    Operating system generated notifications
        Calendar alerts
        Alarm/Timer alert
        Battery low
        Battery dead Exemplary code for detecting several different types of interruptions on an iPhone device is provided below:

```
function interruptionListener(activityType,userId) {
    var activityType = activityType ;
    var userId = userId ;
    //Called when a specific test type or other activity
is started. Runs when user is taking a test or engaged in
any other activity where interruptions are to be
controlled
    function
onInterrupt(interruptionType,activityType,userId) {
        var interruptionType = interruptionType ;
        var activityType = activityType ;
        var userId = userId ;
        //If interruption is of a type that
transgressed the rules, regard it as an interruption.
Otherwise, ignore it
        if ( interruptionType === 'phone_call' ||
            interruptionType === 'network_present' ||
```

-continued

```
            interruptionType === 'app_sent_from_front'
    ||
            interruptionType === 'app_switched' ||
            interruptionType === 'home_button_pressed'
    ||
            interruptionType === 'screen_turned_off'
    ||
            interruptionType === 'screen_shot' ||
            interruptionType ===
    'notification_received' ||
            interruptionType ===
    'open_settings_manager' ||
            interruptionType ===
    'external_display_connected' ||
            interruptionType ===
    'remote_media_connected' ) {
                //Increment the interruptions total for
    this activityType
                    activityType.interruptionsTotal =
    activityType.interruptionsTotal+1 ;
                //Calculate whether to warn or block
    activity
                if (activityType.interruptionsTotal >= y
    && activityType.interruptionsTotal <= n) {
                    interruptionWarning(userId) ;
                } else if (activityType.interruptionsTotal
    >= n) {
                    blockActivity(activityType,userId) ;
                }
            } else {
                //Ignore this interruption type and do
    nothing
            }
        }
    }
```

In step 303, one or more actions are generated in response to the detection of the interruption.

The actions may be one or more of restarting the test, notifying the invigilator, recording the interruption with the test, displaying a warning message to the user, locking the test, and/or transmitting a message to a device or administration server for the test provider.

The type of action to be generated may be dependent, at least in part, on the test. For example, non-timed tests may generate warnings while timed tests may be locked.

In one embodiment, detection of subsequent interruptions for the same test may trigger different types of actions. In one embodiment, an action is generated only once a first threshold of interruption is breached. The first threshold may be number of interruptions or interruptions may be weighted, and the first threshold may be related to the accumulation of detected interruption weights. In one embodiment, a different type of action may be generated if a second threshold is breached. As for the first threshold, the second threshold may be number of interruptions or interruptions may be weighted, and the second threshold may be related to the accumulation of detected interruption weights. The second threshold is greater than the first threshold. For example, a first interruption may trigger a warning and a second interruption may restart the test. Alternatively, a first interruption may trigger a warning and test restart, and a second interruption may trigger a notification and lock the test.

In one embodiment, if the action is locking the test, the test may be unlocked by action from an administrator.

Figure 4:
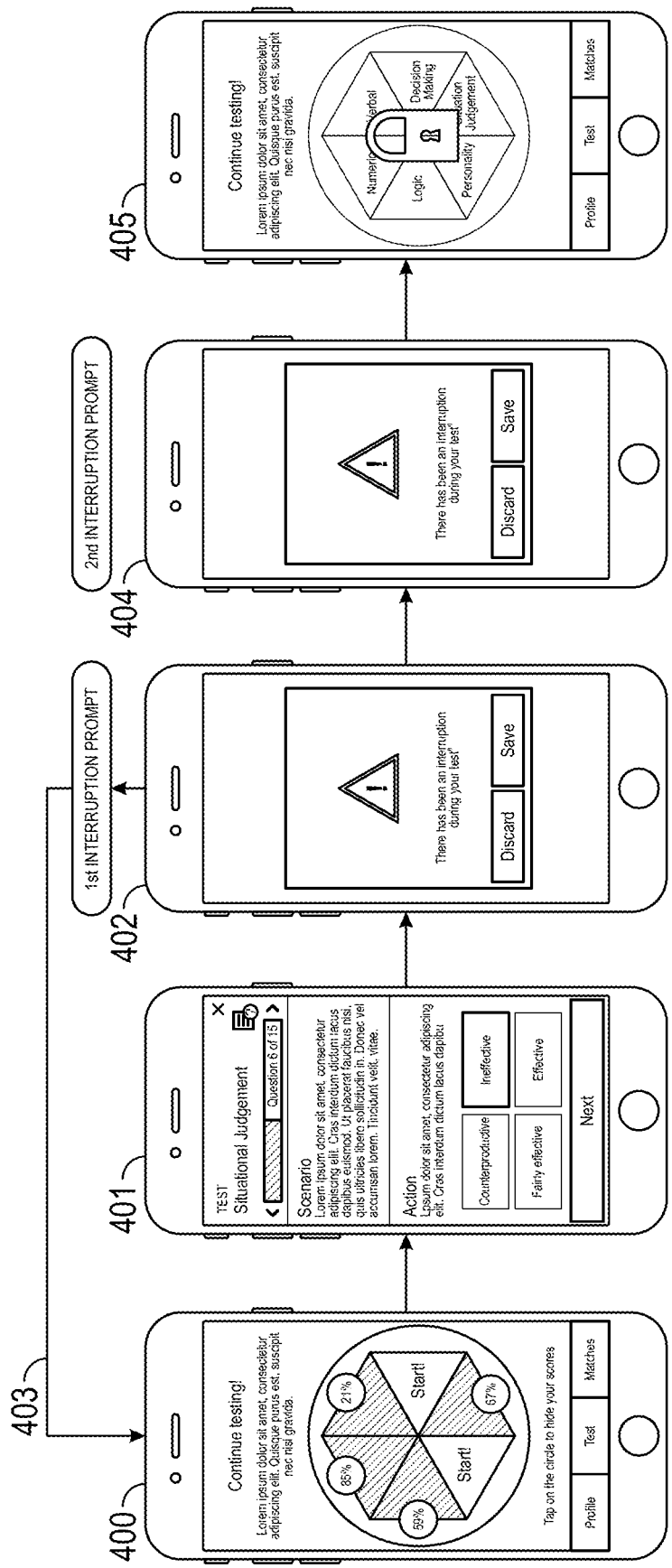
FIG. 4: shows a flow diagram with screenshots from a device illustrating a method of an embodiment of the invention.

FIG. 4 shows a flow diagram with screenshots on a device illustrating a method of the invention.

In step 400, a menu screen is displayed for a user to select a test to complete.

In step 401, a test screen comprising a question and plurality of user interface elements corresponding to answers are displayed. The user may select and/or confirm selection of an answer by interacting with the user interface elements.

In step 402, an interruption at the device has been detected and an interruption warning screen is displayed.

In step 403, in response to this first interruption, the test is halted and the user is returned to the menu screen to restart the test.

In step 404, a second interruption at the device has been detected and an interruption warning screen is displayed.

In step 405, in response to this second interruption, the test is locked and the user is unable to restart the test.

A potential advantage of some embodiments of the present invention is that an improved mobile device is provided which enables users to take tests on that device under monitored conditions without the intervention of a human supervisor.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art.

Therefore, the invention in its broader aspects is not limited to the specific details, representative apparatus and method, and illustrative examples shown and described. Accordingly, departures may be made from such details without departure from the spirit or scope of applicant's general inventive concept.

The invention claimed is:

1. A method for controlling a test environment on a mobile device including:
   providing a test to a user within a testing phase on the mobile device;
   detecting a user-driven interruption created by the user via the mobile device during the testing phase, the user-driven interruption includes the user making a phone-call, the user sending a text-message, the user turning off a screen of the mobile device, or the user locking the mobile device;
   generating an action in response to the detected user-driven interruption, wherein the action includes one or more actions selected from the set of restarting the test, notifying an invigilator, recording the user-driven interruption with the test, locking the test, and transmitting a message by the mobile device to another device associated with a provider of the test; and
   detecting a further interruption during the testing phase after detecting the user-driven interruption, and generating a second action, different to the action generated for the user-driven interruption, wherein the second action includes locking the test if the test is a time test and displaying a warning if the test is non-timed.

2. A method as claimed in claim 1, wherein the test is a psychometric test.

3. A method as claimed in claim 1, wherein the user-driven interruption includes a user accessing another application on the mobile device or an operating system function.

4. A method as claimed in claim 1, further comprising detecting a communication-driven interruption via the mobile device during the testing phase, and generating an action in response to the detected communication-driven interruption, wherein the communication-driven interruption is a phone-call, a text message, or a server-side originating notification.

5. A method as claimed in claim 1, further comprising detecting a locally-driven interruption via the mobile device during the testing phase, and generating an action in response to the detected locally-driven interruption, wherein the locally-driven interruption is from another application executing on the mobile device or from an operating system of the mobile device.

6. A method as claimed in claim 1, wherein the action includes displaying a warning message to the user.

7. A method as claimed in claim 1, wherein the test is provided to the user by a software application executing on the mobile device.

8. A method as claimed in claim 7, wherein the software application detects the interruption and generates the action.

9. A system for controlling a test environment on a mobile device, the system including:
   a processor configured to:
      provide a test to a user within a testing phase on the mobile device,
      detect a user-driven interruption created by the user via the mobile device during the testing phase, the user-driven interruption includes the user making a phone-call, the user sending a text-message, the user turning off a screen of the mobile device, or the user locking the mobile device,
      generate an action in response to the detected user-driven interruption, wherein the action includes one or more actions selected from the set of restarting the test, notifying an invigilator, recording the user-driven interruption with the test, locking the test, and transmitting a message by the mobile device to another device associated with a provider of the test, and
      detect a further interruption during the testing phase after detecting the user-driven interruption, and generate a second action, different to the action generated for the user-driven interruption, wherein the second action includes locking the test if the test is a time test and displaying a warning if the test is non-timed; and
   a memory configured to store the test.

10. A non-transitory computer readable medium storing a computer program that, when executed by a processor, cause the processor to:
   provide a test to a user within a testing phase on a mobile device;
   detect a user-driven interruption created by the user via the mobile device during the testing phase, the user-driven interruption includes the user making a phone-call, the user sending a text-message, the user turning off a screen of the mobile device, or the user locking the mobile device;
   generate an action in response to the detected user-driven interruption, wherein the action includes one or more actions selected from the set of restarting the test, notifying an invigilator, recording the user-driven interruption with the test, locking the test, and transmitting a message by the mobile device to another device associated with a provider of the test; and
   detect a further interruption during the testing phase after detecting the user-driven interruption, and generate a second action, different to the action generated for the user-driven interruption, wherein the second action includes locking the test if the test is a time test and displaying a warning if the test is non-timed.

11. The system of claim 9, wherein the processor is further configured to:
   detect a communication-driven interruption via the mobile device during the testing phase, generate an action in response to the detected communication-driven interruption, detect a locally-driven interruption via the mobile device during the testing phase, and generate an action in response to the detected locally-driven interruption.

12. The system of claim 11, wherein the locally-driven interruption is from another application executing on the mobile device or from an operating system of the mobile device and the communication-driven interruption is a phone-call, a text message, or a server-side originating notification.

13. The system of claim 9, wherein the test is provided to the user by a testing application executing on the mobile device, and the testing application detects the user-driven interruption and generates the action in response to the detected user-driven interruption.

14. The system of claim 9, wherein the test is provided to the user by a testing application executing on the mobile device, and the testing application detects the user-driven interruption performed by the user on the mobile device outside of the testing application.

15. The system of claim 9, wherein the second action includes locking the test to prevent the user from restarting the test.

16. The method of claim 1, wherein the second action includes locking the test to prevent the user from restarting the test.

17. The medium of claim 10, wherein the second action includes locking the test to prevent the user from restarting the test.

* * * * *